United States Patent
Yeo et al.

(10) Patent No.: US 11,247,576 B2
(45) Date of Patent: Feb. 15, 2022

(54) POWER FACTOR CORRECTION CIRCUIT CAPABLE OF PERFORMING BIDIRECTIONAL POWER TRANSFER AND CHARGER INCLUDING THE SAME

(71) Applicants: HYUNDAI MOTOR COMPANY, Seoul (KR); KIA MOTORS CORPORATION, Seoul (KR)

(72) Inventors: In Yong Yeo, Bucheon-si (KR); Woo Young Lee, Yongin-si (KR); Gyu Yeong Choe, Suwon-si (KR); Jin Young Yang, Hanam-si (KR); Ji Han Lee, Hwaseong-si (KR); Si Hun Yang, Hwaseong-si (KR); Young Jin Kim, Incheon (KR); Min Seong Choi, Daejeon (KR); Jong Pil Kim, Suwon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 2 days.

(21) Appl. No.: 16/924,150

(22) Filed: Jul. 8, 2020

(65) Prior Publication Data
US 2021/0178919 A1    Jun. 17, 2021

(30) Foreign Application Priority Data
Dec. 16, 2019    (KR) .................. 10-2019-0168260

(51) Int. Cl.
*B60L 53/22*    (2019.01)
*H02J 7/02*    (2016.01)

(52) U.S. Cl.
CPC ............... *B60L 53/22* (2019.02); *H02J 7/02* (2013.01)

(58) Field of Classification Search
CPC .................................. B60L 53/22; H02J 7/02
(Continued)

(56) References Cited

U.S. PATENT DOCUMENTS 6,912,142 B2 *    6/2005    Keim et al. ............. H02P 9/305
                                                            363/89
8,687,338 B2 *    4/2014    Odaohhara et al. .. H02J 7/0031
                                                            361/104
(Continued)

FOREIGN PATENT DOCUMENTS

JP    2017121174 A    7/2017
KR    101245647    3/2013
(Continued)

*Primary Examiner* — Sun J Lin
(74) *Attorney, Agent, or Firm* — McDonnell Boehnen Hulbert & Berghoff LLP

(57) ABSTRACT

Disclosed is a power factor correction circuit including a plurality of legs connected in parallel and each leg including two switching devices connected in series, a plurality of inductors, each inductor having one terminal connected to an interconnection node of the two switching devices in a corresponding one of the plurality of legs, and a controller configured to control on/off states of the switching devices of the plurality of legs in a pulse width modulation manner such that each of the inductors of the plurality of inductors is built up twice or more in one switching period of the switching devices when an alternating current (AC) voltage is input to the other terminal of each inductor of the plurality of inductors.

16 Claims, 9 Drawing Sheets

(58) Field of Classification Search
USPC .......................................................... 320/109
See application file for complete search history.

(56) References Cited

U.S. PATENT DOCUMENTS

| | | | | |
|---|---|---|---|---|
| 8,891,261 | B2 * | 11/2014 | Jang et al. | ............... H02M 7/23 |
| | | | | 363/44 |
| 9,455,620 | B2 * | 9/2016 | Yu et al. | .................. H02M 1/12 |
| 9,685,881 | B2 * | 6/2017 | Ghosh et al. | ......... H02M 7/217 |
| 9,787,212 | B2 * | 10/2017 | Baumann et al. | ....... H02P 27/06 |
| 10,661,671 | B2 * | 5/2020 | Kim | ........................ H02M 1/36 |
| 11,025,161 | B2 * | 6/2021 | Kim | ........................ B60L 53/20 |
| 2014/0077770 | A1 * | 3/2014 | Omoto et al. | ......... H02M 7/217 |
| | | | | 320/140 |
| 2018/0281609 | A1 | 4/2018 | Yang et al. | |

FOREIGN PATENT DOCUMENTS

| | | |
|---|---|---|
| KR | 20160057524 A | 5/2016 |
| KR | 20180078779 A | 7/2018 |

* cited by examiner

POWER FACTOR CORRECTION CIRCUIT CAPABLE OF PERFORMING BIDIRECTIONAL POWER TRANSFER AND CHARGER INCLUDING THE SAME

CROSS-REFERENCE TO THE RELATED APPLICATION

This application claims priority from Korean Patent Application No. 10-2019-0168260, filed on Dec. 16, 2019, in the Korean Intellectual Property Office, the disclosure of which is incorporated herein by reference in its entirety.

BACKGROUND

1. Field of the Disclosure

The present disclosure relates to a power factor correction circuit, and more particularly to a power factor correction circuit capable of performing bidirectional power transfer and a charger including the same.

2. Description of the Related Art

In general, a power factor correction circuit for improvement of a power factor is provided in a charger which charges a battery of a vehicle. Typically, the power factor correction circuit has a topology of a boost converter which is implemented with an inductor, a diode, and a switching circuit.

Such a conventional power factor correction circuit can perform only unidirectional power transfer, in that a diode is provided on a power transfer line. For this reason, the conventional power factor correction circuit cannot implement vehicle-to-everything (V2X) externally to provide battery power for a vehicle.

Therefore, there is a need for a topology and control scheme of a power factor correction circuit capable of operating bidirectionally, for implementation of V2X.

It will be understood that the above matters described in the related art are merely for promotion of understanding of the background of the disclosure and should not be recognized as prior art well-known to those skilled in the art.

SUMMARY

It is an object of the present disclosure to provide a power factor correction circuit capable of performing bidirectional power transfer and a charger including the same.

In accordance with an aspect of the present disclosure, the above and other objects can be accomplished by the provision of a power factor correction circuit including a plurality of legs connected in parallel and each including two switching devices connected in series, a plurality of inductors each having one terminal connected to an interconnection node of the two switching devices in a corresponding one of the legs, and a controller configured to control on/off states of the switching devices in a pulse width modulation manner such that each of the inductors is built up twice or more in one switching period of the switching devices when an alternating current (AC) voltage is input to the other terminal of each of the inductors.

The controller may compare the AC voltage input to each of the inductors with a sawtooth wave having a predetermined switching period and control the on/off states of the switching devices based on results of the comparison.

AC voltages of three phases with phase differences of 120 degrees may be input respectively to the other terminals of the inductors, the controller may include a plurality of comparators each configured to compare a corresponding one of the AC voltages of the three phases with a sawtooth wave having a predetermined switching period and output a result of the comparison as a logic high value or a logic low value, and a plurality of inverters configured to invert outputs of the comparators, respectively, and the output of each of the comparators and an output of each of the inverters inverting the output of a corresponding one of the comparators may be applied to control the switching devices in a corresponding one of the legs, respectively.

A single-phase AC voltage may be input between the other terminals of the inductors, the controller may include a plurality of comparators each configured to compare a corresponding one of the single-phase AC voltage and a voltage obtained by inverting the single-phase AC voltage on the basis of 0V, with a sawtooth wave having a predetermined switching period, and output a result of the comparison as a logic high value or a logic low value, and a plurality of inverters configured to invert outputs of the comparators, respectively, and the output of each of the comparators and an output of each of the inverters inverting the output of a corresponding one of the comparators may be applied to control the switching devices in a corresponding one of the legs, respectively.

The legs may include a first leg, a second leg and a third leg, the inductors may include a first inductor, a second inductor and a third inductor each having one terminal connected to a corresponding one of the first leg, the second leg and the third leg, and AC voltages of three phases with phase differences of 120 degrees may be input respectively to the other terminals of the first inductor, the second inductor and the third inductor.

The controller may include a first comparator, a second comparator and a third comparator each configured to compare a corresponding one of the AC voltages of the three phases input respectively to the other terminals of the first inductor, the second inductor and the third inductor with a sawtooth wave having a predetermined switching period and output a result of the comparison as a logic high value or a logic low value, and a first inverter, a second inverter and a third inverter configured to invert outputs of the first comparator, the second comparator and the third comparator, respectively, an upper switching device in the first leg may be controlled by the output of the first comparator, a lower switching device in the first leg may be controlled by an output of the first inverter, an upper switching device in the second leg may be controlled by the output of the second comparator, a lower switching device in the second leg may be controlled by an output of the second inverter, an upper switching device in the third leg may be controlled by the output of the third comparator, and a lower switching device in the third leg may be controlled by an output of the third inverter.

The legs may include a first leg and a second leg, the inductors may include a first inductor and a second inductor, each having one terminal connected to a corresponding one of the first leg and the second leg, and a single-phase AC voltage may be input between the other terminal of the first inductor and the other terminal of the second inductor.

The controller may include a first comparator and a second comparator, each configured to compare a corresponding one of the single-phase AC voltage and a voltage obtained by inverting the single-phase AC voltage on the basis of 0V, with a sawtooth wave having a predetermined switching period, and output a result of the comparison as a logic high value or a logic low value, and a first inverter and a second inverter configured to invert outputs of the first comparator and the second comparator, respectively, an upper switching device in the first leg may be controlled by the output of the first comparator, a lower switching device in the first leg may be controlled by an output of the first inverter, an upper switching device in the second leg may be controlled by the output of the second comparator, and a lower switching device in the second leg may be controlled by an output of the second inverter.

In accordance with another aspect of the present disclosure, there is provided a charger including a power factor correction circuit including a plurality of legs connected in parallel and each including two switching devices connected in series, a plurality of inductors each having one terminal connected to an interconnection node of the two switching devices in a corresponding one of the legs, and a controller configured to control on/off states of the switching devices in a pulse width modulation manner such that each of the inductors is built up twice in one switching period of the switching devices when an alternating current (AC) voltage is input to the other terminal of each of the inductors, and a bidirectional converter connected between the power factor correction circuit and a battery and configured to, for charging of the battery, convert a level of a direct current (DC) voltage output from the power factor correction circuit into a chargeable level of the battery and apply the level-converted voltage to the battery, and to, for external output of power of the battery, convert a level of a voltage of the battery and provide the level-converted voltage to the power factor correction circuit.

For charging of the battery, the controller may compare the AC voltage input to each of the inductors with a sawtooth wave having a predetermined switching period and control the on/off states of the switching devices based on results of the comparison.

For charging of the battery, AC voltages of three phases with phase differences of 120 degrees may be input respectively to the other terminals of the inductors, the controller may include a plurality of comparators each configured to, for charging of the battery, compare a corresponding one of the AC voltages of the three phases with a sawtooth wave having a predetermined switching period and output a result of the comparison as a logic high value or a logic low value, and a plurality of inverters configured to invert outputs of the comparators, respectively, and the output of each of the comparators and an output of each of the inverters inverting the output of a corresponding one of the comparators may be applied to control the switching devices in a corresponding one of the legs, respectively.

For charging of the battery, a single-phase AC voltage may be input between the other terminals of the inductors, the controller may include a plurality of comparators each configured to, for charging of the battery, compare a corresponding one of the single-phase AC voltage and a voltage obtained by inverting the single-phase AC voltage on the basis of 0V, with a sawtooth wave having a predetermined switching period, and output a result of the comparison as a logic high value or a logic low value, and a plurality of inverters configured to invert outputs of the comparators, respectively, and the output of each of the comparators and an output of each of the inverters inverting the output of a corresponding one of the comparators may be applied to control the switching devices in a corresponding one of the legs, respectively.

The legs may include a first leg, a second leg and a third leg, the inductors may include a first inductor, a second inductor and a third inductor each having one terminal connected to a corresponding one of the first leg, the second leg and the third leg, and, for charging of the battery, AC voltages of three phases with phase differences of 120 degrees may be input respectively to the other terminals of the first inductor, second inductor and third inductor.

The controller may include a first comparator, a second comparator and a third comparator each configured to, for charging of the battery, compare a corresponding one of the AC voltages of the three phases input respectively to the other terminals of the first inductor, the second inductor and the third inductor with a sawtooth wave having a predetermined switching period and output a result of the comparison as a logic high value or a logic low value, and a first inverter, a second inverter and a third inverter configured to invert outputs of the first comparator, the second comparator and the third comparator, respectively, and, for charging of the battery, an upper switching device in the first leg may be controlled by the output of the first comparator, a lower switching device in the first leg may be controlled by an output of the first inverter, an upper switching device in the second leg may be controlled by the output of the second comparator, a lower switching device in the second leg may be controlled by an output of the second inverter, an upper switching device in the third leg may be controlled by the output of the third comparator, and a lower switching device in the third leg may be controlled by an output of the third inverter.

The legs may include a first leg and a second leg, the inductors may include a first inductor and a second inductor each having one terminal connected to a corresponding one of the first leg and the second leg, and, for charging of the battery, a single-phase AC voltage may be input between the other terminal of the first inductor and the other terminal of the second inductor.

The controller may include a first comparator and a second comparator each configured to, for charging of the battery, compare a corresponding one of the single-phase AC voltage and a voltage obtained by inverting the single-phase AC voltage on the basis of 0V, with a sawtooth wave having a predetermined switching period, and output a result of the comparison as a logic high value or a logic low value, and a first inverter and a second inverter configured to invert outputs of the first comparator and the second comparator, respectively, and, for charging of the battery, an upper switching device in the first leg may be controlled by the output of the first comparator, a lower switching device in the first leg may be controlled by an output of the first inverter, an upper switching device in the second leg may be controlled by the output of the second comparator, and a lower switching device in the second leg may be controlled by an output of the second inverter.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION

Reference will now be made in detail to the preferred embodiments of the present disclosure, examples of which are illustrated in the accompanying drawings. Wherever possible, the same reference numbers will be used throughout the drawings to refer to the same or like parts.

Figure 1:
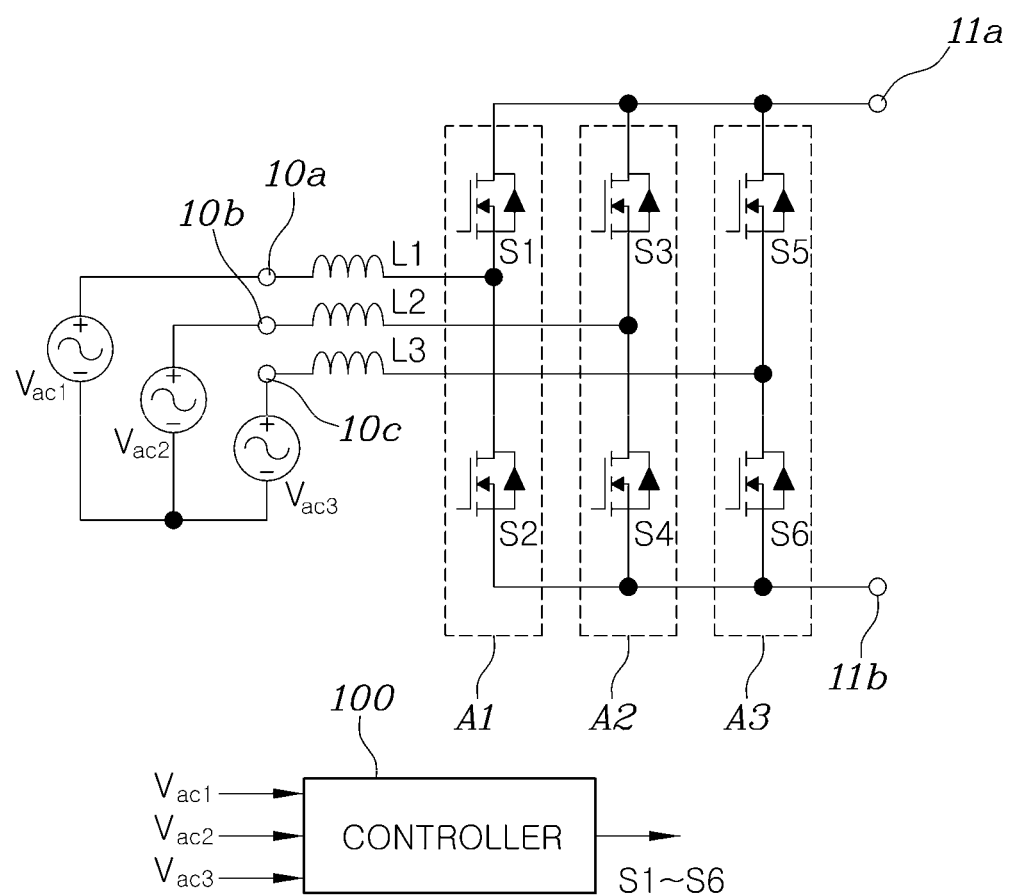
FIG. 1 is a circuit diagram showing the configuration of a power factor correction circuit capable of performing bidirectional power transfer, according to one embodiment of the present disclosure.
Figure 2:
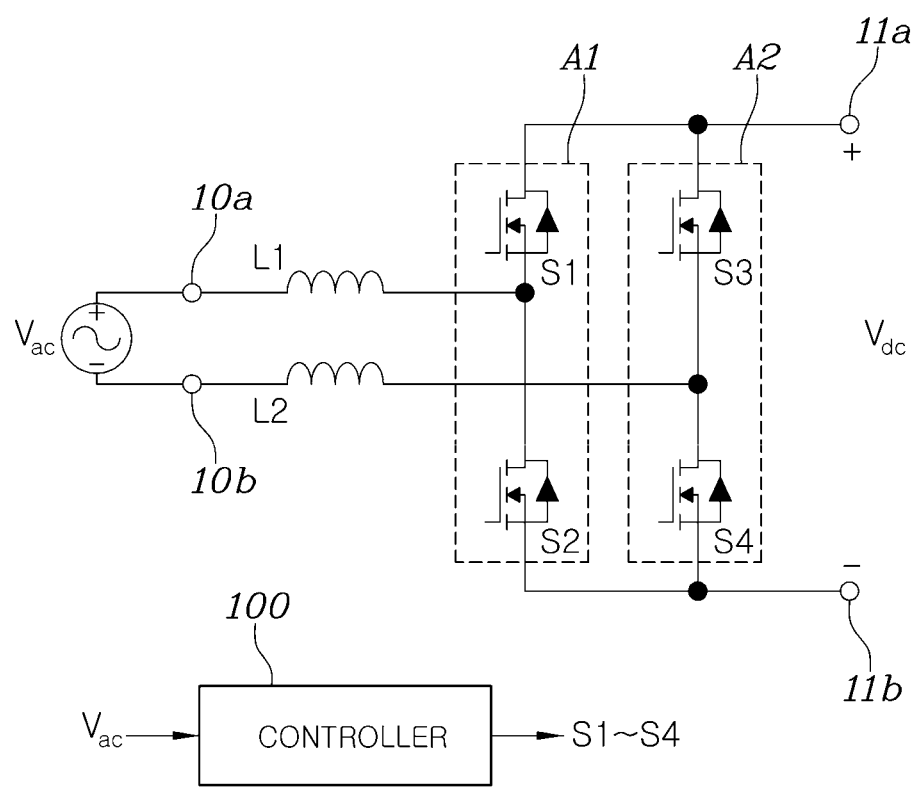
FIG. 2 is a circuit diagram showing the configuration of a power factor correction circuit capable of performing bidirectional power transfer, according to another embodiment of the present disclosure.

FIG. 1 is a circuit diagram showing the configuration of a power factor correction circuit capable of performing bidirectional power transfer, according to one embodiment of the present disclosure, and FIG. 2 is a circuit diagram showing the configuration of a power factor correction circuit capable of performing bidirectional power transfer, according to another embodiment of the present disclosure. The embodiment shown in FIG. 1 is an example in which three-phase alternating current (AC) power is input, and the embodiment shown in FIG. 2 is an example in which single-phase AC power is input.

Referring to FIG. 1, the power factor correction circuit according to the one embodiment of the present disclosure may include a plurality of legs A1, A2 and A3 connected in parallel and each including two switching devices S1 and S2, S3 and S4 or S5 and S6 connected in series, a plurality of inductors L1, L2 and L3 each having one terminal connected to an interconnection node of the two switching devices in a corresponding one of the legs A1, A2 and A3, and a controller 100 configured to control on/off states of the switching devices.

The other terminals of the inductors L1, L2 and L3 become AC input/output terminals 10a, 10b and 10c of the power factor correction circuit, respectively, and parallel-connected nodes of the legs A1, A2 and A3 become direct current (DC) input/output terminals 11a and 11b of the power factor correction circuit, respectively.

In the embodiment shown in FIG. 1, an AC voltage corresponding to one phase of a three-phase AC voltage may be applied to each of the AC input/output terminals 10a, 10b and 10c, and a DC voltage may be applied between the DC input/output terminals 11a and 11b.

Referring to FIG. 2, the power factor correction circuit according to the other embodiment of the present disclosure may include a plurality of legs A1 and A2 connected in parallel and each including two switching devices S1 and S2 or S3 and S4 connected in series, a plurality of inductors L1 and L2 each having one terminal connected to an interconnection node of the two switching devices in a corresponding one of the legs A1 and A2, and a controller 100 configured to control on/off states of the switching devices.

The other terminals of the inductors L1 and L2 become AC input/output terminals 10a and 10b of the power factor correction circuit, respectively, and parallel-connected nodes of the legs A1 and A2 become DC input/output terminals 11a and 11b of the power factor correction circuit, respectively.

In the embodiment shown in FIG. 2, a single-phase AC voltage may be applied between the AC input/output terminals 10a and 10b, and a DC voltage may be applied between the DC input/output terminals 11a and 11b.

As shown in FIGS. 1 and 2, the power factor correction circuit according to the various embodiments of the present disclosure is substantially the same in circuit configuration as an inverter which performs DC to AC power conversion, and may thus be referred to as an inverter-type power factor correction circuit.

In the embodiments shown in FIGS. 1 and 2, the controller 100 may control the on/off states of the switching devices S1 to S6 in a pulse width modulation manner such that each of the inductors L1 to L3 is built up twice in one switching period of the switching devices.

Figure 3:
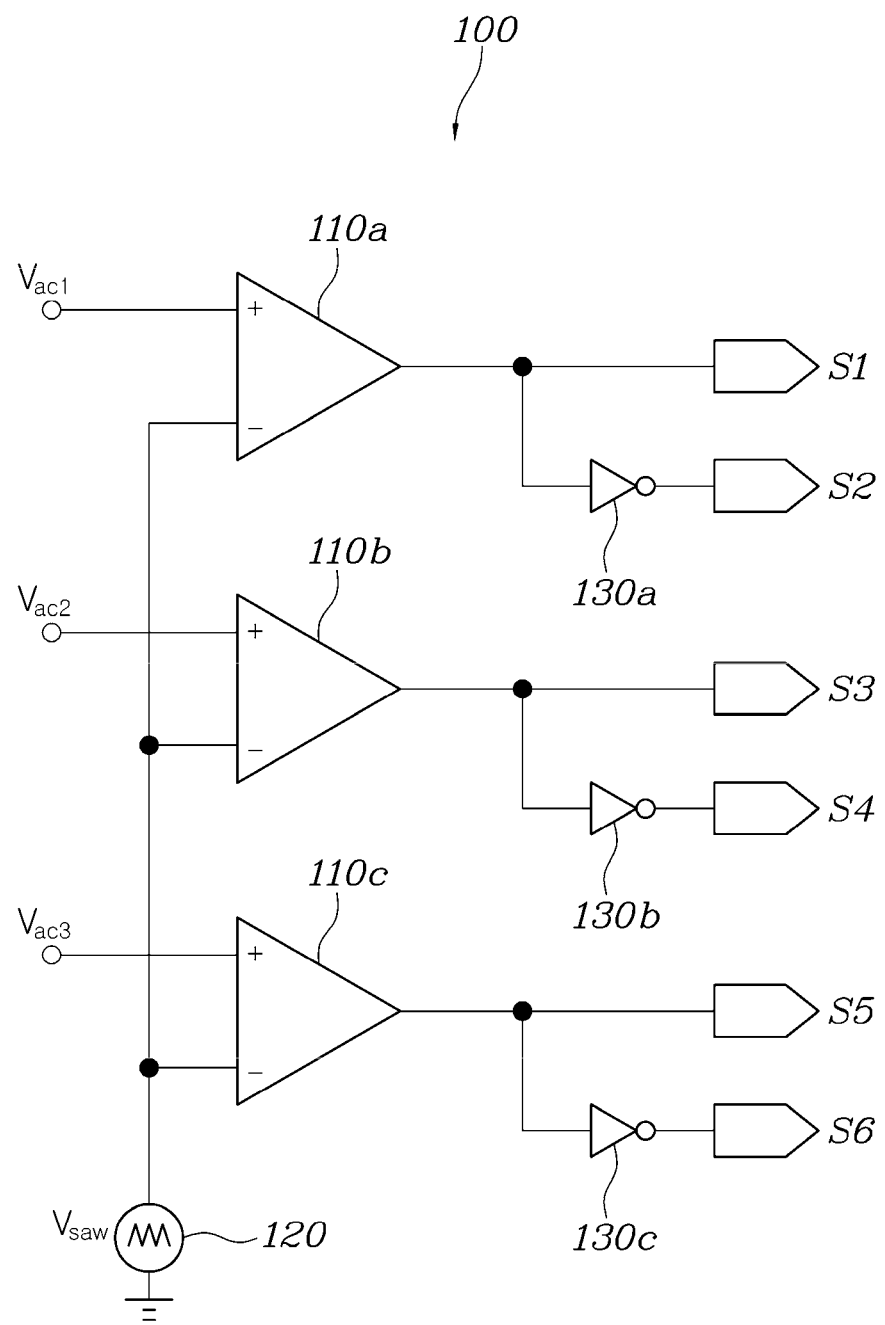
FIG. 3 is a circuit diagram of a controller of the power factor correction circuit shown in FIG. 1.
Figure 4:
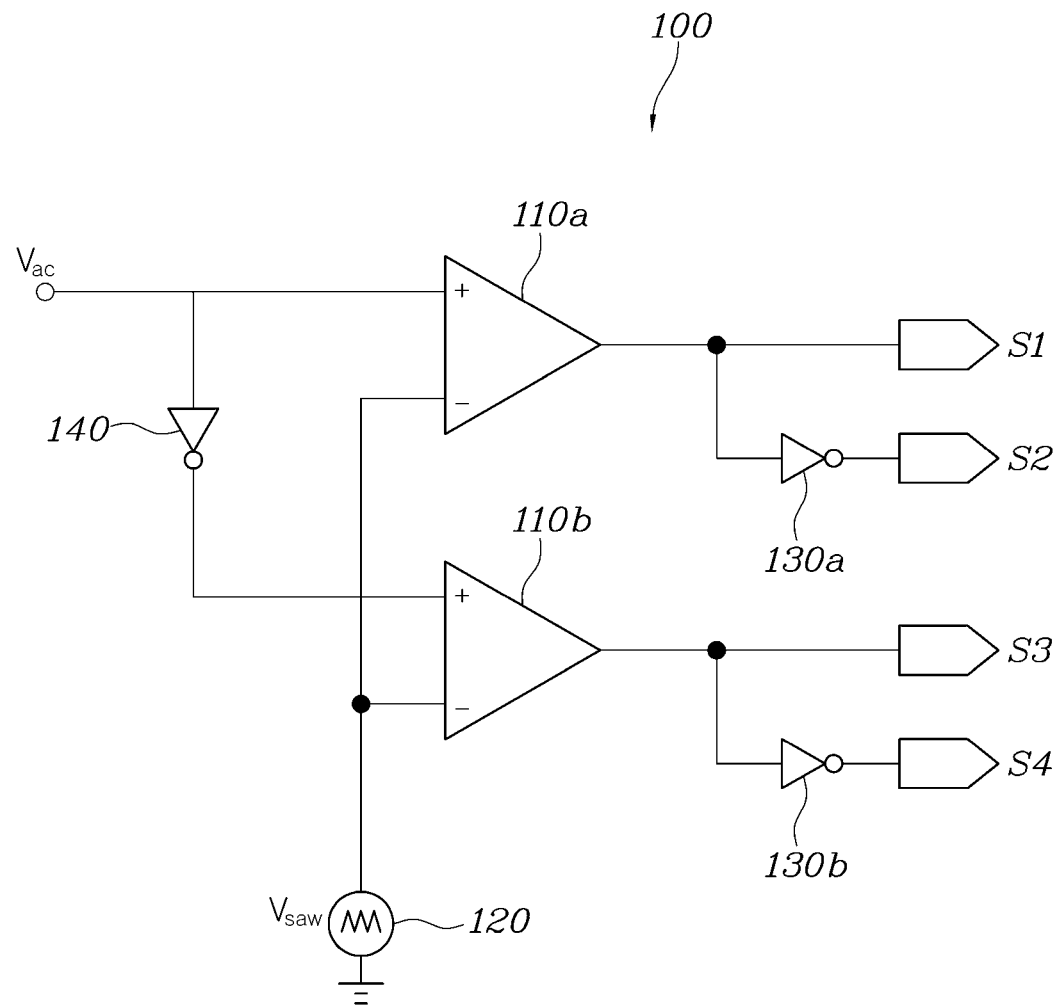
FIG. 4 is a circuit diagram of a controller of the power factor correction circuit shown in FIG. 2.

To this end, the controller 100 may have a configuration as shown in FIG. 3 or 4.

FIG. 3 is a circuit diagram of the controller of the power factor correction circuit shown in FIG. 1, and FIG. 4 is a circuit diagram of the controller of the power factor correction circuit shown in FIG. 2.

Referring to FIGS. 3 and 4, the controller 100 may include a sawtooth wave generator 120 configured to output a sawtooth wave Vsaw having a predetermined switching period, and comparators 110a, 110b and 110c configured to compare AC voltages Vac1, Vac2 and Vac3 of respective phases input through the AC input/output terminals 10a, 10b and 10c with the sawtooth wave Vsaw output from the sawtooth wave generator 120 and output results of the comparison as control signals for determination of the on/off states of the switching devices S1 to S6 in the respective legs, respectively. The period of the sawtooth wave Vsaw corresponds to a switching period in which the switching devices S1 to S6 are turned on/off, and is much shorter than a period of input AC power.

The first comparator 110a in FIG. 3 outputs a control signal for control of the on/off states of the switching devices S1 and S2 in the first leg A1. The switching devices S1 and S2 in the first leg A1 may be turned on/off in a complementary manner. To this end, the switching device S1 may be controlled directly by the control signal output from the first comparator 110a, and the switching device S2 may be controlled by an inverted control signal from an inverter 130a, which inverts the control signal output from the first comparator 110a.

Likewise, the second comparator 110b outputs a control signal for control of the on/off states of the switching devices S3 and S4 in the second leg A2. The switching devices S3 and S4 in the second leg A2 may be turned on/off in a complementary manner. To this end, the switching device S3 may be controlled directly by the control signal output from the second comparator 110b, and the switching device S4 may be controlled by an inverted control signal from an inverter 130b, which inverts the control signal output from the second comparator 110b.

Likewise, the third comparator 110c outputs a control signal for control of the on/off states of the switching devices S5 and S6 in the third leg A3. The switching devices S5 and S6 in the third leg A3 may be turned on/off in a complementary manner. To this end, the switching device S5 may be controlled directly by the control signal output from the third comparator 110c, and the switching device S6 may be controlled by an inverted control signal from an inverter 130c, which inverts the control signal output from the third comparator 110c.

The first comparator 110a in FIG. 4 outputs a control signal for control of the on/off states of the switching devices S1 and S2 in the first leg A1. The switching devices S1 and S2 in the first leg A1 may be turned on/off in a complementary manner. To this end, the switching device S1 may be controlled directly by the control signal output from the first comparator 110a, and the switching device S2 may be controlled by an inverted control signal from an inverter 130a, which inverts the control signal output from the first comparator 110a.

The second comparator 110b compares a voltage output from an inverter 140, which inverts an input single-phase AC voltage, with the sawtooth wave Vsaw output from the sawtooth wave generator 120, and provides a result of the comparison as a control signal for the switching devices S3 and S4 in the second leg A2. The inverter 140 may invert the input single-phase AC voltage on the basis of 0V and output the inverted voltage. The switching devices S3 and S4 in the second leg A2 may be turned on/off in a complementary manner. To this end, the switching device S3 may be controlled directly by the control signal output from the second comparator 110b, and the switching device S4 may be controlled by an inverted control signal from an inverter 130b, which inverts the control signal output from the second comparator 110b.

Figure 5:
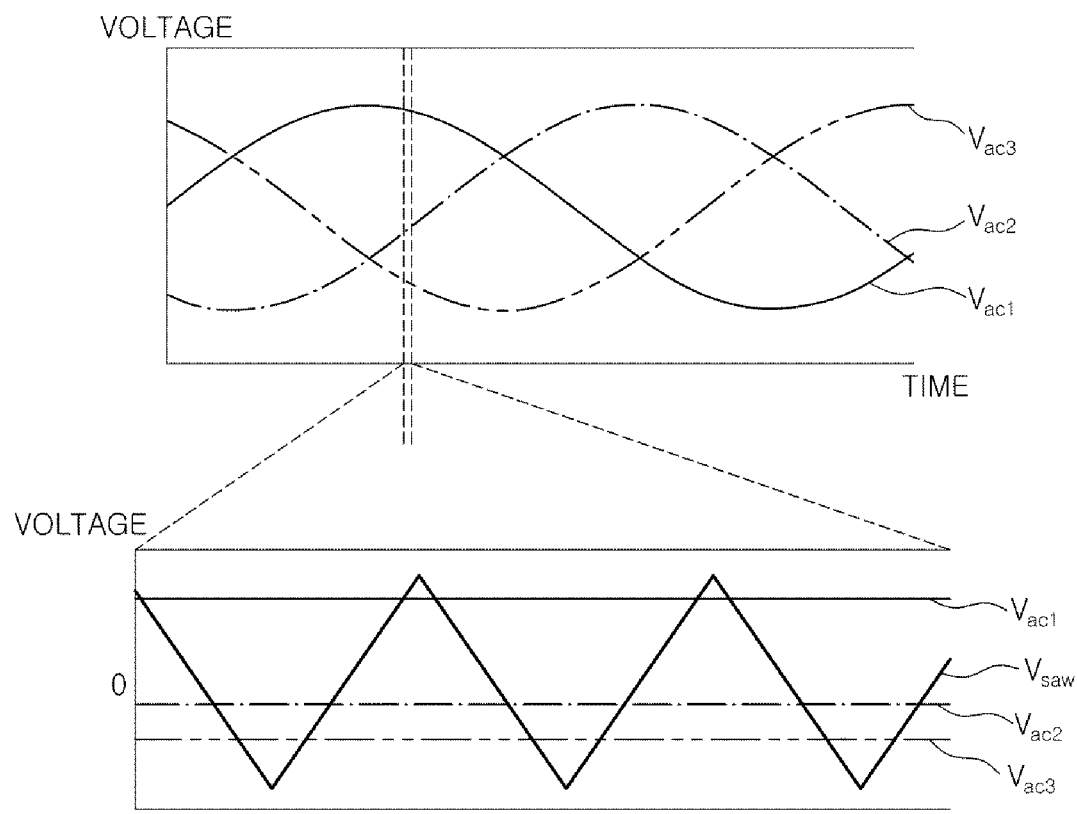
FIG. 5 is a view including a waveform diagram of an input voltage and a comparative waveform diagram of a waveform of the input voltage and a sawtooth wave illustrating a control process performed by the controller of FIG. 3.
Figure 6:
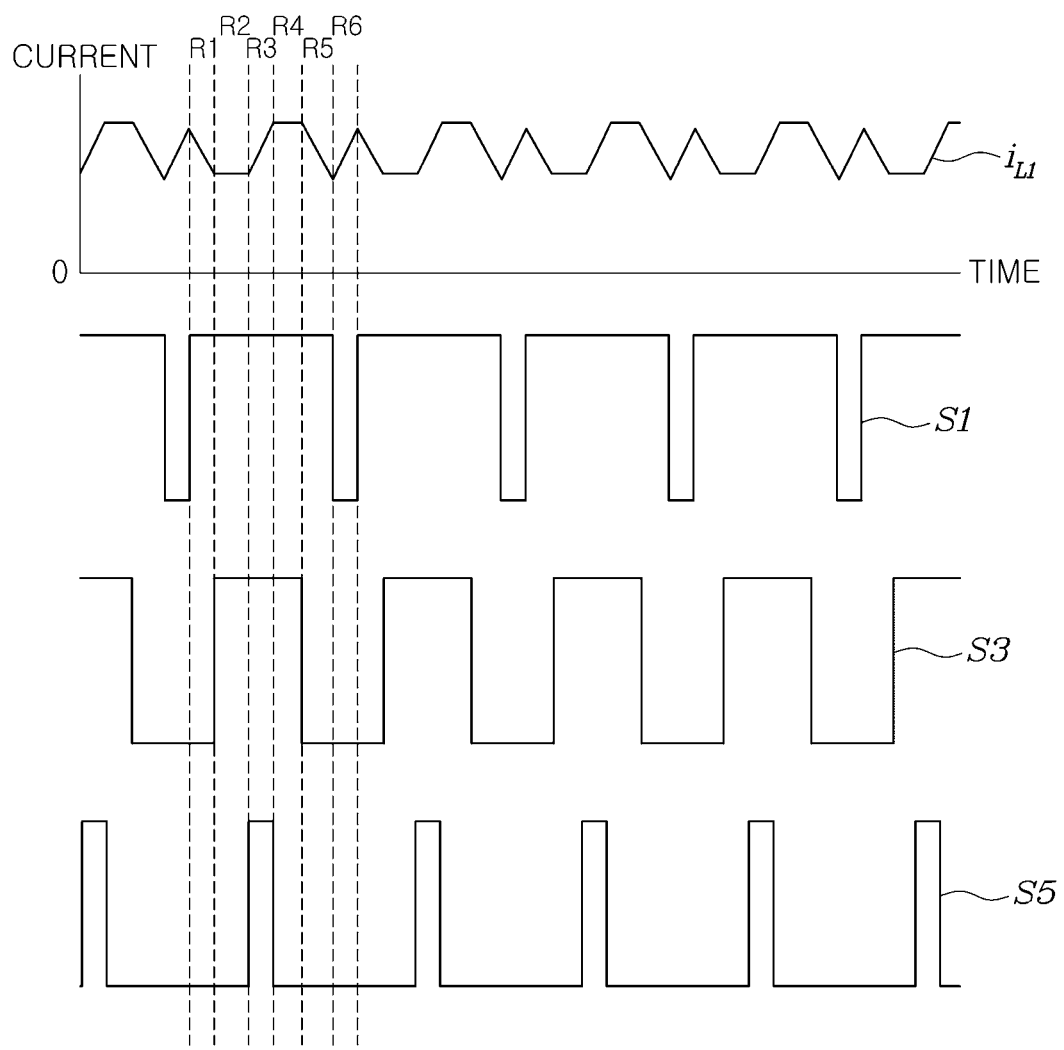
FIG. 6 is a view showing output current and switching control signals of the power factor correction circuit of FIG. 1 based on a result of comparison between the input voltage waveform and the sawtooth wave in FIG. 5.

FIG. 5 is a view including a waveform diagram of an input voltage and a comparative waveform diagram of a waveform of the input voltage and a sawtooth wave illustrating a control process performed by the controller of FIG. 3, and FIG. 6 is a view showing output current and switching control signals of the power factor correction circuit of FIG. 1 based on a result of comparison between the input voltage waveform and the sawtooth wave in FIG. 5.

As shown in FIG. 5, three-phase AC power input to the AC input/output terminals 10a, 10b and 10c has AC voltages Vac1, Vac2 and Vac3 of three phases with phase differences of 120 degrees, which are compared with the sawtooth wave Vsaw, respectively, by the comparators 110a, 110b and 110c. The comparators 110a, 110b and 110c may output logic high signals in durations in which the AC voltages Vac1, Vac2 and Vac3 of the three phases are higher than the sawtooth wave Vsaw, and logic low signals in durations in which the AC voltages Vac1, Vac2 and Vac3 are lower than the sawtooth wave Vsaw. The reason why the AC voltages Vac1, Vac2 and Vac3 of the three phases compared with the sawtooth wave Vsaw are expressed like DC voltages in FIG. 5 is that the switching period of the sawtooth wave Vsaw is much shorter than the period of each AC voltage.

By virtue of the configuration of the controller 100 as shown in FIG. 3, in the durations in which the AC voltages Vac1, Vac2 and Vac3 of the three phases input respectively to the legs A1, A2 and A3 are higher than the sawtooth wave Vsaw, the upper switching devices S1, S3 and S5 in the corresponding legs A1, A2 and A3 may be turned on and the lower switching devices S2, S4 and S6 therein may be turned off, and, in the durations in which the AC voltages Vac1, Vac2 and Vac3 are lower than the sawtooth wave Vsaw, the upper switching devices S1, S3 and S5 in the corresponding legs A1, A2 and A3 may be turned off and the lower switching devices S2, S4 and S6 therein may be turned on.

The uppermost waveform of FIG. 6 represents current of the inductor L1 connected to the leg A1. In durations R1 and R5 of FIG. 6, the upper switching device S1 in the leg A1 is turned on and the upper switching devices S3 and S5 in the legs A2 and A3 are turned off. In these durations, the a-phase AC voltage Vac1 is positive and the b-phase AC voltage Vac2 and the c-phase AC voltage Vac3 are both negative or lower than the a-phase AC voltage Vac1. Energy stored in the a-phase inductor L1 is transferred to the DC input/output terminals 11a and 11b while the current of the inductor L1 is reduced. For reference, because the lower switching devices S2, S4 and S6 in the respective legs A1, A2 and A3 operate complementarily with the upper switching devices S1, S3 and S5 therein, illustration of the on/off states of the lower switching devices S2, S4 and S6 is omitted in FIG. 6.

In durations R2 and R4 of FIG. 6, the upper switching devices S1 and S3 in the legs A1 and A2 are turned on and the lower switching device S6 in the leg A3 is turned off. In these durations, an electrical path may be directly formed between the a phase and the b phase by the turning-on of the upper switching devices S1 and S3, and an electrical path may be formed between the a phase and the c phase via the DC input/output terminals 11a and 11b by the turning-on of the upper switching device S1 and the lower switching device S6. As a result, in the durations R2 and R4 of FIG. 6, the current of the inductor L1 is reduced while energy stored in the inductor L1 is provided to the DC input/output terminals 11a and 11b, and then increased by the electrical path directly formed between the a phase and the b phase. In the durations R2 and R4, because the a-phase AC voltage Vac1 is higher than the b-phase AC voltage Vac2 and the c-phase AC voltage Vac3, the current of the inductor L1 may be reduced by an amount smaller than that in the durations R1 and R5 or be almost constant.

In a duration R3 of FIG. 6, the upper switching devices S1, S3 and S5 in the legs A1, A2 and A3 are all turned on. In this duration, by the turning-on of the upper switching devices S1, S3 and S5, an electrical path may be directly formed between the a phase and the b phase and an electrical path may be directly formed between the a phase and the c phase. In this duration, no power is transferred to the DC input/output terminals 11a and 11b, and the inductor L1 is built up while the current thereof is increased.

In a duration R6 of FIG. 6, the upper switching devices S1, S3 and S5 in the legs A1, A2 and A3 are all turned off and the lower switching devices S2, S4 and S6 therein are all turned on. This duration is an inductor buildup duration in which no power is transferred to the DC input/output terminals 11a and 11b of the power factor correction circuit and energy is stored in the inductor L1, similarly to the duration R3.

In this manner, in the power factor correction circuit according to the one embodiment of the present disclosure, the inductor is built up twice in one switching period. Therefore, inductance of the inductor may be reduced to almost ½ of that in a general power factor correction circuit, thereby making it possible to reduce the size of the inductor.

Although the inductor L1 connected to the leg A1 has been described as an example in FIG. 6, it will be readily understood by those skilled in the art that the inductors L2 and L3 of the other phases also perform similar operations.

Figure 7:
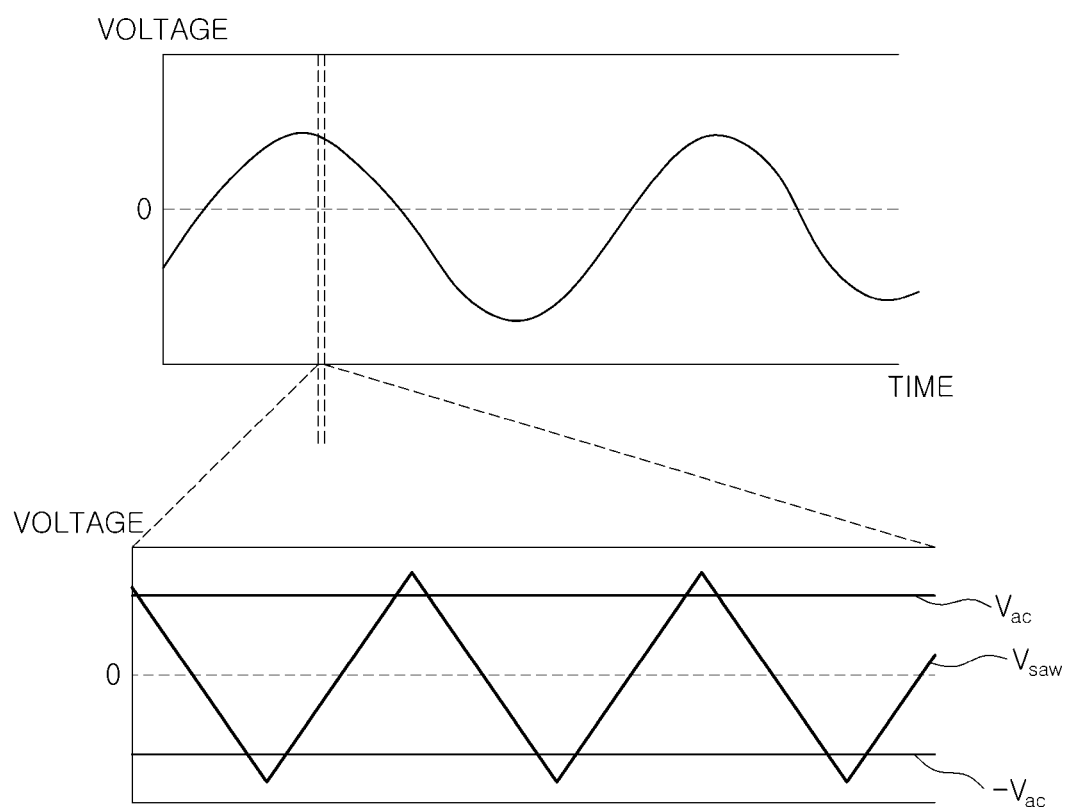
FIG. 7 is a view including a waveform diagram of an input voltage and a comparative waveform diagram of a waveform of the input voltage and a sawtooth wave illustrating a control process performed by the controller of FIG. 4.
Figure 8:
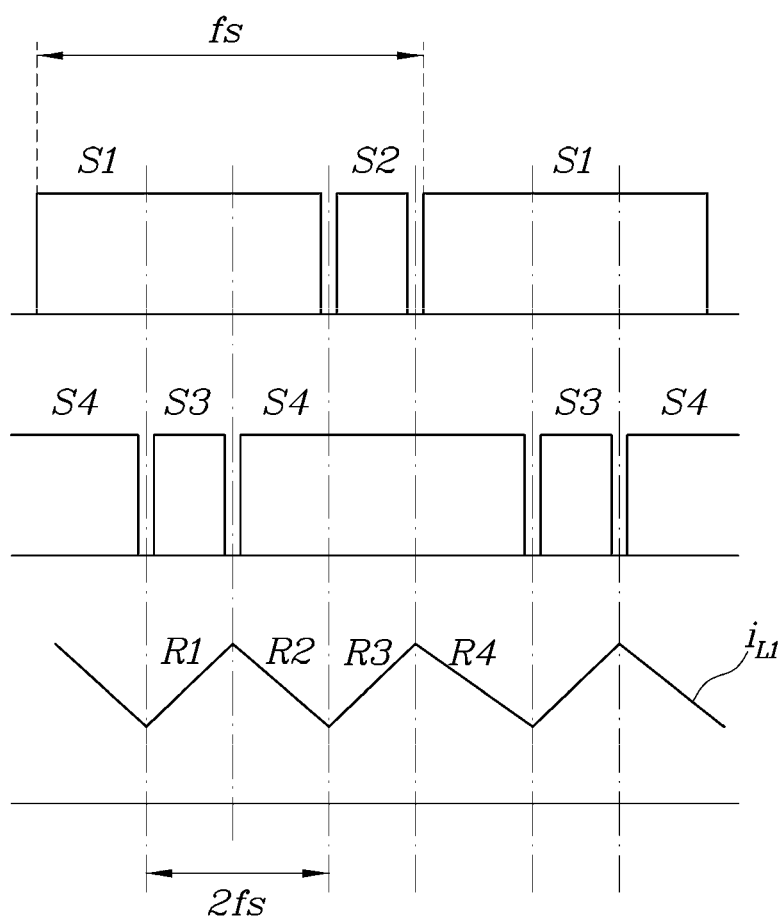
FIG. 8 is a view showing output current and switching control signals of the power factor correction circuit of FIG. 2 based on a result of comparison between the input voltage waveform and the sawtooth wave in FIG. 7.

FIG. 7 is a view including a waveform diagram of an input voltage and a comparative waveform diagram of a waveform of the input voltage and a sawtooth wave illustrating a control process performed by the controller of FIG. 4, and FIG. 8 is a view showing output current and switching control signals of the power factor correction circuit of FIG. 2 based on a result of comparison between the input voltage waveform and the sawtooth wave in FIG. 7.

As shown in FIG. 7, a single-phase AC voltage Vac and an inverted version −Vac thereof input to the AC input/output terminals 10a and 10b are compared with the sawtooth wave Vsaw, respectively, by the comparators 110a and 110b. The comparators 110a and 110b may output logic high signals in durations in which the two voltages Vac and −Vac are higher than the sawtooth wave Vsaw, and logic low signals in durations in which the two voltages Vac and −Vac are lower than the sawtooth wave Vsaw. The reason why the AC voltages Vac and −Vac compared with the sawtooth wave Vsaw are expressed like DC voltages in FIG. 7 is that the switching period of the sawtooth wave Vsaw is much shorter than the period of each AC voltage.

By virtue of the configuration of the controller 100 as shown in FIG. 4, in the duration in which the AC voltage Vac input to the leg A1 is higher than the sawtooth wave Vsaw, the upper switching device S1 in the leg A1 is turned on and the lower switching device S2 therein is turned off. Also, in the duration in which the AC voltage −Vac is higher than the sawtooth wave Vsaw, the upper switching device S3 in the leg A2 is turned on and the lower switching device S4 therein is turned off.

The lowermost waveform of FIG. 8 represents current of the inductor L1 connected to the leg A1. In a duration R1 of FIG. 8, the upper switching device S1 in the leg A1 and the upper switching device S3 in the leg A2 are turned on. In this duration, a current loop is formed between the AC input/output terminals 10a and 10b by the switching devices S1 and S3, so that the inductor L1 is built up (i.e., the inductor current is increased).

In a duration R2 of FIG. 8, the upper switching device S1 in the leg A1 and the lower switching device S4 in the leg A2 are turned on. In this duration, electrical connections are made between the AC input/output terminals 10a and 10b and the DC input/output terminals 11a and 11b, so that energy stored in the inductor L1 may be transferred to the DC input/output terminals 11a and 11b (i.e., the inductor current is reduced).

In a duration R3 of FIG. 8, the lower switching device S2 in the leg A1 and the lower switching device S4 in the leg A2 are turned on. In this duration, a current loop is formed between the AC input/output terminals 10a and 10b by the switching devices S1 and S3 similarly to in the duration R1, so that the inductor L1 is built up (i.e., the inductor current is increased).

In a duration R4 of FIG. 8, the upper switching device S1 in the leg A1 and the lower switching device S4 in the leg A2 are turned on. In this duration, energy stored in the inductor L1 may be transferred to the DC input/output terminals 11a and 11b (i.e., the inductor current is reduced), in the same manner as in the duration R2.

In this manner, in the power factor correction circuit according to the other embodiment of the present disclosure, the inductor is built up twice in one switching period even when a single-phase AC voltage is input. Therefore, inductance of the inductor may be reduced to almost ½ of that in a general power factor correction circuit, thereby making it possible to reduce the size of the inductor.

The operations of the power factor correction circuit described with reference to FIGS. 3 to 8 are examples applicable to the case of receiving external input AC power, converting the input AC power into DC power and outputting the converted DC power.

Figure 9:
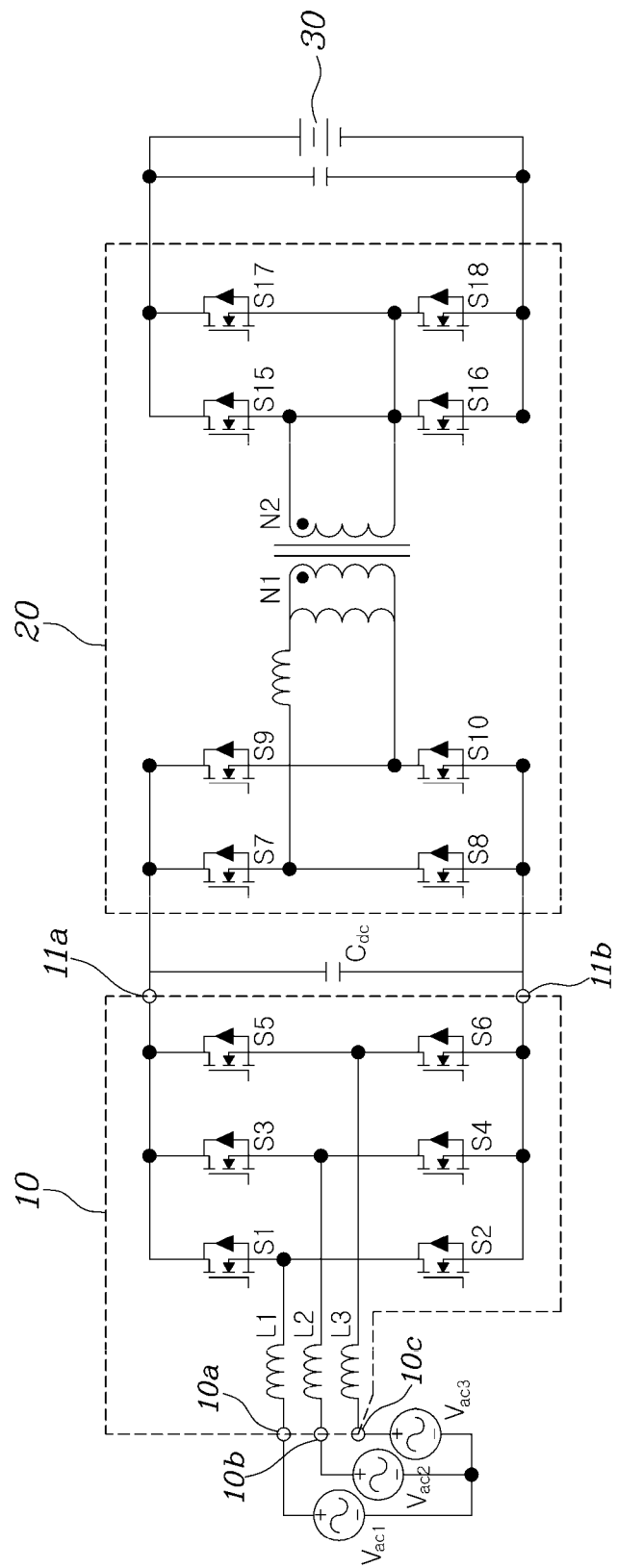
FIG. 9 is a circuit diagram of a charger including a power factor correction circuit capable of performing bidirectional power transfer, according to an embodiment of the present disclosure.

FIG. 9 is a circuit diagram of a charger including a power factor correction circuit capable of performing bidirectional power transfer, according to an embodiment of the present disclosure.

Referring to FIG. 9, the charger according to the present embodiment may include the above-stated power factor correction circuit 10 according to the one embodiment of the present disclosure, and a bidirectional DC converter 20 connected between the DC input/output terminals 11a and 11b of the power factor correction circuit 10 and a battery 30.

Although the bidirectional DC converter 20 is implemented with topology of an LLC resonant converter in the embodiment of FIG. 9, it may be substituted with a converter of any other bidirectional topology (for example, a full-bridge phase shift converter).

For charging of the battery 30, AC power input to the AC input/output terminals 10a, 10b and 10c is converted into DC power by the inverter-type power factor correction circuit 10 and then input to the bidirectional DC converter 20. The bidirectional DC converter 20 may perform a proper control operation to convert the level of a DC voltage input from the power factor correction circuit 10 into the level of a battery 30 chargeable voltage. A DC voltage of the level converted by the bidirectional DC converter 20 may be applied to the battery 30 to charge the battery 30.

Conversely, for output of power of the battery 30 as AC power, the bidirectional DC converter 20 may convert the level of a voltage of the battery 30 into a proper level and provide the level-converted voltage to the power factor correction circuit 10. The power factor correction circuit may receive a DC voltage from the bidirectional DC converter 20 through the DC input/output terminals 11a and 11b, generate three-phase AC power using a typical inverter control algorithm and then output the three-phase AC power to the AC input/output terminals 10a, 10b and 10c.

As stated above, because the power factor correction circuit capable of performing bidirectional power transfer according to the various embodiments of the present disclosure may not only convert AC power into DC power but also convert DC power into AC power, it is appropriate to implement V2X externally outputting battery power of a vehicle in an AC form.

In addition, because the power factor correction circuit may selectively employ a three-phase system or a single-phase system, it may be variously applied to AC inputs of various specifications without separate modification in configuration. For example, under the condition that hardware is implemented in a form having the three-phase AC input/output terminals 10a, 10b and 10c as shown in FIG. 1, only the two AC input/output terminals 10a and 10b may be utilized in a country employing a single-phase AC power system, to receive input AC power. As a result, a charger may be used in common in both a country employing a three-phase AC power system, such as a country in Europe, and a country employing a single-phase AC power system, such as a country in North America.

As is apparent from the above description, in a power factor correction circuit capable of performing bidirectional power transfer and a charger including the same according to embodiments of the present disclosure, an inductor is built up twice in one switching period. Therefore, inductance of the inductor may be reduced to almost ½ of that in a general power factor correction circuit, thereby making it possible to reduce the physical size of the inductor.

Further, because the power factor correction circuit may not only convert AC power into DC power but also convert DC power into AC power, it is appropriate to implement V2X externally outputting battery power of a vehicle in an AC form.

In addition, because the power factor correction circuit may selectively employ a three-phase system or a single-phase system, it may be variously applied to AC inputs of various specifications without separate modification in configuration.

It will be appreciated by those skilled in the art that the effects achievable through the present disclosure are not limited to those that have been particularly described hereinabove and that other unmentioned effects of the present disclosure will be more clearly understood from the above detailed description.

Although the preferred embodiments of the present disclosure have been disclosed for illustrative purposes, those skilled in the art will appreciate that various modifications, additions and substitutions are possible, without departing from the scope and spirit of the disclosure as disclosed in the accompanying claims.

What is claimed is:

1. A power factor correction circuit comprising:
   a plurality of legs connected in parallel and each leg comprising two switching devices connected in series;
   a plurality of inductors, each inductor having one terminal connected to an interconnection node of the two switching devices in a corresponding leg of the plurality of legs; and
   a controller configured to control on/off states of the switching devices of the plurality of legs in a pulse width modulation manner such that each inductor of the plurality of inductors is built up twice or more in one switching period of the switching devices when an alternating current (AC) voltage is input to another terminal of each inductor of the plurality of inductors.

2. The power factor correction circuit according to claim 1, wherein the controller compares the AC voltage input to each inductor of the plurality of inductors with a sawtooth wave having a predetermined switching period and controls the on/off states of the switching devices of the plurality of legs based on results of a comparison.

3. The power factor correction circuit according to claim 1, wherein AC voltages of three phases with phase differences of 120 degrees are input respectively to the other terminals of the inductors,
   wherein the controller comprises:
   a plurality of comparators, each comparator configured to compare a corresponding one of the AC voltages of the three phases with a sawtooth wave having a predetermined switching period and output a result of a comparison as a logic high value or a logic low value; and
   a plurality of inverters configured to invert outputs of the plurality of comparators, respectively, and
   wherein the output of each comparator of the plurality of comparators and an output of each inverter of the plurality of inverters inverting the output of a corresponding one of the plurality of comparators are applied to control the switching devices in a corresponding one leg of the plurality of legs, respectively.

4. The power factor correction circuit according to claim 1, wherein a single-phase AC voltage is input between the other terminals of the plurality of inductors,
   wherein the controller comprises:
   a plurality of comparators, each comparator configured to compare a corresponding one of the single-phase AC voltage and a voltage obtained by inverting the single-phase AC voltage on the basis of 0V, with a sawtooth wave having a predetermined switching period, and output a result of a comparison as a logic high value or a logic low value; and
   a plurality of inverters configured to invert outputs of the plurality of comparators, respectively, and
   wherein the output of each comparator of the plurality of comparators and an output of each inverter of the plurality of inverters inverting the output of a corresponding one of the plurality of comparators are applied to control the switching devices in a corresponding one of the plurality of legs, respectively.

5. The power factor correction circuit according to claim 1, wherein the plurality of legs comprise a first leg, a second leg and a third leg, and the plurality of inductors comprise a first inductor, a second inductor and a third inductor each having one terminal connected to a corresponding one of the first leg, the second leg and the third leg,
   wherein AC voltages of three phases with phase differences of 120 degrees are input respectively to the other terminals of the first inductor, the second inductor and the third inductor.

6. The power factor correction circuit according to claim 5, wherein the controller comprises:
   a first comparator, a second comparator and a third comparator each configured to compare a corresponding one of the AC voltages of the three phases input respectively to the other terminals of the first inductor, the second inductor and the third inductor with a sawtooth wave having a predetermined switching period and output a result of a comparison as a logic high value or a logic low value; and
   a first inverter, a second inverter and a third inverter configured to invert outputs of the first comparator, the second comparator and the third comparator, respectively,
   wherein an upper switching device in the first leg is controlled by the output of the first comparator, a lower switching device in the first leg is controlled by an output of the first inverter, an upper switching device in the second leg is controlled by the output of the second comparator, a lower switching device in the second leg is controlled by an output of the second inverter, an upper switching device in the third leg is controlled by the output of the third comparator, and a lower switching device in the third leg is controlled by an output of the third inverter.

7. The power factor correction circuit according to claim 1, wherein the plurality of legs comprise a first leg and a second leg, and the plurality of inductors comprise a first inductor and a second inductor each having one terminal connected to a corresponding one of the first leg and the second leg,
   wherein a single-phase AC voltage is input between the another terminal of the first inductor and the another terminal of the second inductor.

8. The power factor correction circuit according to claim 7, wherein the controller comprises:
   a first comparator and a second comparator each configured to compare a corresponding one of the single-phase AC voltage and a voltage obtained by inverting the single-phase AC voltage on the basis of 0V, with a sawtooth wave having a predetermined switching period, and output a result of a comparison as a logic high value or a logic low value; and a first inverter and a second inverter configured to invert outputs of the first comparator and the second comparator, respectively, wherein an upper switching device in the first leg is controlled by an output of the first comparator, a lower switching device in the first leg is controlled by an output of the first inverter, an upper switching device in the second leg is controlled by an output of the second comparator, and a lower switching device in the second leg is controlled by an output of the second inverter.

9. A charger comprising:

a power factor correction circuit comprising a plurality of legs connected in parallel and each leg comprising two switching devices connected in series, a plurality of inductors each inductor having one terminal connected to an interconnection node of the two switching devices in a corresponding leg of the plurality of legs, and a controller configured to control on/off states of the switching devices of the plurality of legs in a pulse width modulation manner such that each inductor of the plurality of inductors is built up twice in one switching period of the switching devices when an alternating current (AC) voltage is input to the other terminal of each inductor of the plurality of inductors; and a bidirectional converter connected between the power factor correction circuit and a battery and configured to, for charging of the battery, convert a level of a direct current (DC) voltage output from the power factor correction circuit into a chargeable level of the battery and apply a level-converted voltage to the battery, and to, for an external output of power of the battery, convert a level of a voltage of the battery and provide the level-converted voltage to the power factor correction circuit.

10. The charger according to claim 9, wherein, for charging of the battery, the controller compares the AC voltage input to each inductor of the plurality of inductors with a sawtooth wave having a predetermined switching period and controls the on/off states of the switching devices of the plurality of legs based on results of the comparison.

11. The charger according to claim 9, wherein, for charging of the battery, AC voltages of three phases with phase differences of 120 degrees are input respectively to the other terminals of the plurality of inductors, wherein the controller comprises:

a plurality of comparators, each comparator configured to, for charging of the battery, compare a corresponding one of the AC voltages of the three phases with a sawtooth wave having a predetermined switching period and output a result of the comparison as a logic high value or a logic low value; and a plurality of inverters configured to invert outputs of the plurality of comparators, respectively, and wherein the output of each comparator of the plurality of comparators and an output of each inverter of the plurality of inverters inverting the output of a corresponding one of the plurality of comparators are applied to control the switching devices in a corresponding one of the plurality of legs, respectively.

12. The charger according to claim 9, wherein, for charging of the battery, a single-phase AC voltage is input between the other terminals of the plurality of inductors, wherein the controller comprises:

a plurality of comparators, each comparator configured to, for charging of the battery, compare a corresponding one of the single-phase AC voltage and a voltage obtained by inverting the single-phase AC voltage on the basis of 0V, with a sawtooth wave having a predetermined switching period, and output a result of the comparison as a logic high value or a logic low value; and a plurality of inverters configured to invert outputs of the plurality of comparators, respectively, and wherein the output of each comparator of the plurality of comparators and an output of each inverter of the plurality of inverters inverting the output of a corresponding one of the plurality of comparators are applied to control the switching devices in a corresponding one leg of the plurality of legs, respectively.

13. The charger according to claim 9, wherein the plurality of legs comprise a first leg, a second leg and a third leg, and the plurality of inductors comprise a first inductor, a second inductor and a third inductor each having one terminal connected to a corresponding one of the first leg, the second leg and the third leg, wherein, for charging of the battery, AC voltages of three phases with phase differences of 120 degrees are input respectively to the other terminals of the first inductor, the second inductor and the third inductor.

14. The charger according to claim 13, wherein the controller comprises:

a first comparator, a second comparator and a third comparator each configured to, for charging of the battery, compare a corresponding one of the AC voltages of the three phases input respectively to the other terminals of the first inductor, the second inductor and the third inductor with a sawtooth wave having a predetermined switching period and output a result of the comparison as a logic high value or a logic low value; and a first inverter, a second inverter and a third inverter configured to invert outputs of the first comparator, the second comparator and the third comparator, respectively, wherein, for charging of the battery, an upper switching device in the first leg is controlled by the output of the first comparator, a lower switching device in the first leg is controlled by an output of the first inverter, an upper switching device in the second leg is controlled by the output of the second comparator, a lower switching device in the second leg is controlled by an output of the second inverter, an upper switching device in the third leg is controlled by the output of the third comparator, and a lower switching device in the third leg is controlled by an output of the third inverter.

15. The charger according to claim 9, wherein the plurality of legs comprise a first leg and a second leg, and the inductors comprise a first inductor and a second inductor each having one terminal connected to a corresponding one of the first leg and the second leg, wherein, for charging of the battery, a single-phase AC voltage is input between the other terminal of the first inductor and the other terminal of the second inductor.

16. The charger according to claim 15, wherein the controller comprises:

a first comparator and a second comparator each configured to, for charging of the battery, compare a corresponding one of the single-phase AC voltage and a voltage obtained by inverting the single-phase AC voltage on the basis of 0V, with a sawtooth wave having a predetermined switching period, and output a result of the comparison as a logic high value or a logic low value; and a first inverter and a second inverter configured to invert outputs of the first comparator and the second comparator, respectively, wherein, for charging of the battery, an upper switching device in the first leg is controlled by the output of the first comparator, a lower switching device in the first leg is controlled by an output of the first inverter, an upper switching device in the second leg is controlled by the output of the second comparator, and a lower switching device in the second leg is controlled by an output of the second inverter.

* * * * *